United States Patent [19]

Carlson et al.

[11] Patent Number: 4,754,276
[45] Date of Patent: Jun. 28, 1988

[54] SYSTEM TO DISPLAY SAWBLADE ANGLE AND HEIGHT

[75] Inventors: Bradley D. Carlson; William J. McMahon, both of Glendale; Warren W. Stansberry, Phoenix, all of Ariz.

[73] Assignee: Schaevitz Sensing Systems, Inc., Phoenix, Ariz.

[21] Appl. No.: 814,450

[22] Filed: Dec. 30, 1985

[51] Int. Cl.[4] .............................................. G08C 19/10
[52] U.S. Cl. .............................. 340/870.37; 324/60 R; 324/60 C; 83/62; 83/522; 125/3; 125/13 R
[58] Field of Search ................... 340/870.37; 324/207, 324/208, 60 R, 60 C, 225, 63, 243; 83/58, 62, 490, 522, 800; 125/3, 12, 13 R, 13 SS, 28; 51/165.74, 225; 364/474, 475; 33/366

[56] References Cited

U.S. PATENT DOCUMENTS

| | | | |
|---|---|---|---|
| 3,992,614 | 11/1976 | Buss | 364/475 |
| 4,077,132 | 3/1978 | Erickson | 340/870.37 |
| 4,410,852 | 10/1983 | Guretzky | 340/870.37 |
| 4,432,260 | 2/1984 | Sakurai et al. | 83/800 |
| 4,438,754 | 3/1984 | Nanny et al. | 324/207 |
| 4,481,845 | 11/1984 | Sarurai et al. | 83/800 |
| 4,654,977 | 4/1987 | Pakus | 33/366 |

Primary Examiner—John W. Caldwell, Sr.
Assistant Examiner—Mahmoud Fatahi-yar
Attorney, Agent, or Firm—Stevens, Davis, Miller & Mosher

[57] ABSTRACT

An apparatus for determining the angle and height of a rotary power saw blade by sensing the angle of the saw blade from the vertical and the sine of the angle with respect to a horizontal reference as the blade height is changed. A display unit converts the sensor output to a visual indication.

3 Claims, 2 Drawing Sheets

SYSTEM TO DISPLAY SAWBLADE ANGLE AND HEIGHT

BACKGROUND OF THE INVENTION

1. Field of the Invention

The invention relates to sensing the angle and height of a rotary power saw blade in relation to a horizontal reference, typically the saw table.

2. Description of the Prior Art

Prior art devices for measuring the angle of the saw blade in relation to the saw table have typically included a circular scale mounted to the frame of the power saw with a pointer attached to the trunnion. As the blade angle is changed by rotating the trunnion, the pointer indicates the angle on the circular scale. Measuring height of the saw blade above the table is typically accomplished using a ruler or other linear scale. The present invention increases the speed and accuracy of measurement and provides for easy interpretation by the operator by using a sensor to provide a voltage proportional to the position of the saw blade which is then converted to a numerical readout.

SUMMARY

The present invention determines the height and angle of a rotary saw blade. Sensors are placed on the mounting of the saw blade so as to provide a voltage proportional to the angle and height of the blade with reference to the vertical and saw table respectively. A visual readout is provided by an A/D converter driving an LCD display.

DESCRIPTION OF THE PREFERRED EMBODIMENT

Figure 1:
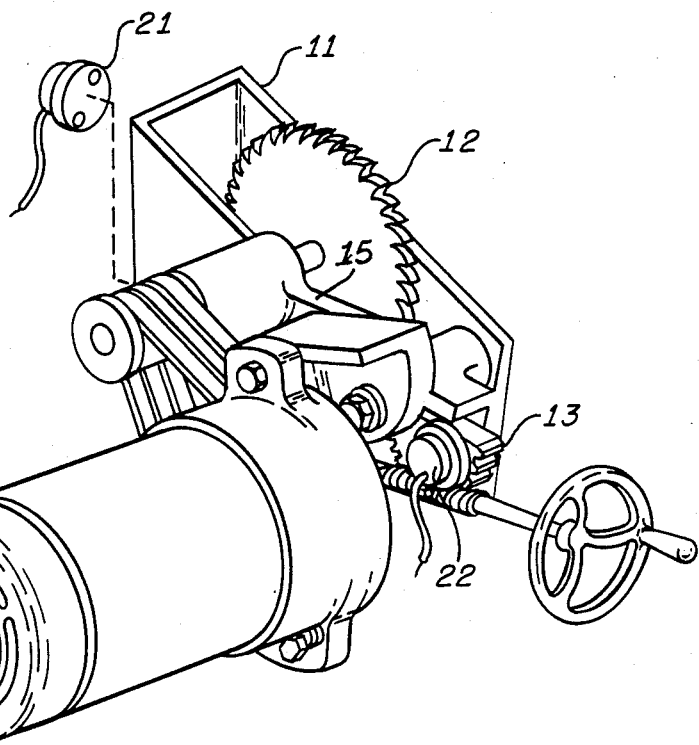
FIG. 1 illustrates a table saw and motor mechanism showing the angle and height sensor position.

Referring to FIG. 1, a typical angle adjustment mechanism 11 for a rotary power saw blade 12 is shown with a typical placement of angle sensor 21. It is to be recognized that various makes of power saw angle adjustment mechanisms may have slightly different structures. Thus the angle sensor 21 may be mounted on any vertical surface perpendicular to the plane of the saw blade 12. The vertical surface upon which the sensor is mounted must rotate as the saw blade is tilted with respect to the vertical such that the angle sensor developes an angle with the vertical that is proportional to the blade angle.

With continuing reference to FIG. 1, a typical height adjusting mechanism 13 for a rotary power saw blade 12 is shown with a typical placement of height sensor 22. It is to be recognized that height sensor 22 may be mounted on any vertical surface that is parallel to the plane of the saw blade such that the height sensor 22 rotates as the height of saw blade 12.

Figure 2:
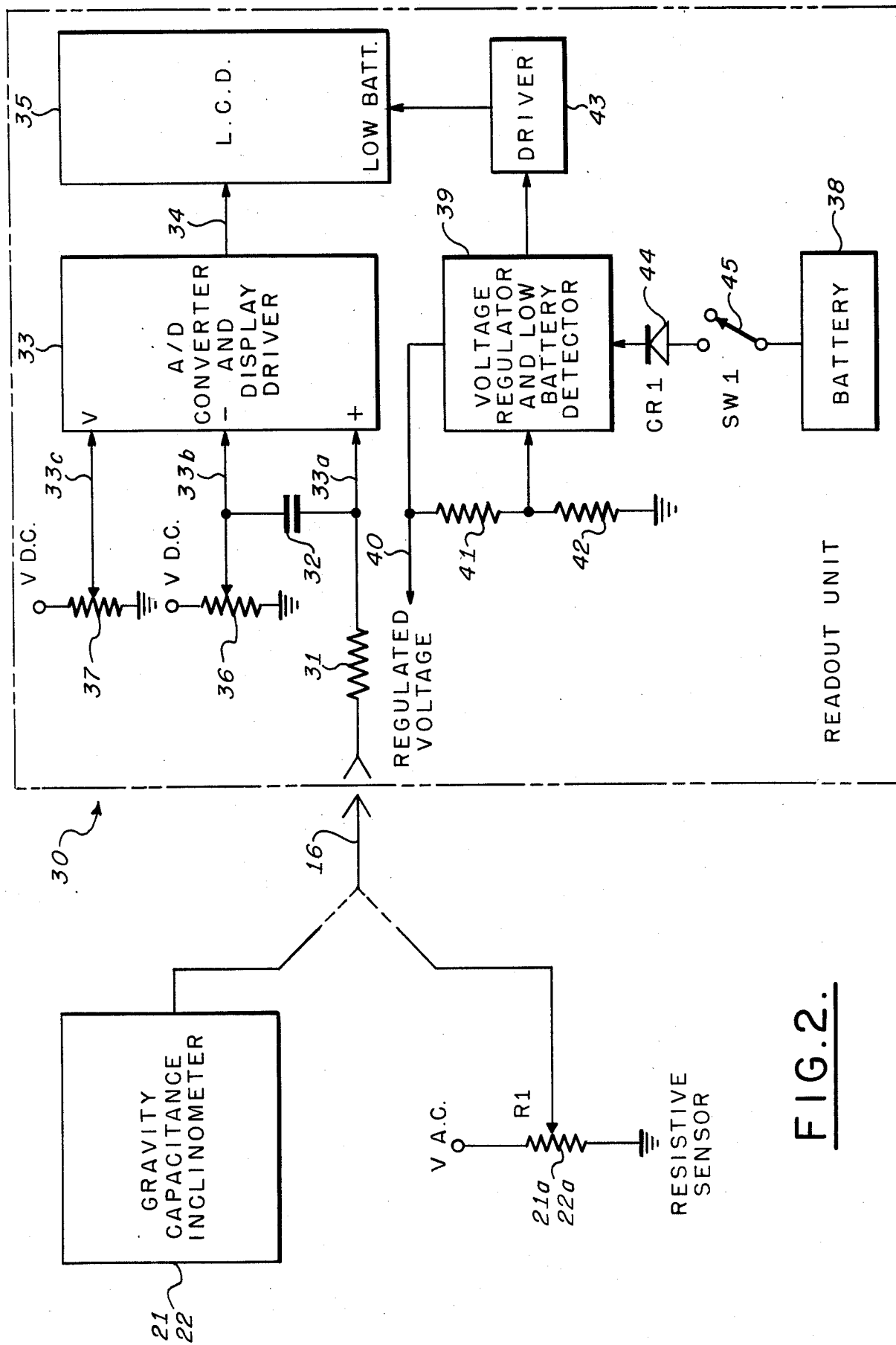
FIG. 2 is a block diagram of the sensors and display system.

Turning now to FIG. 2, the operation of capacitive angle and height sensors 21 and 22, the alternative resistive angle and height sensors 21a and 22a and display unit 30 will be described. The capacitive angle and height sensors 21 and 22 produce a change in output voltage with a change in the angle of the sensor body. A gravity capacitance inclinometer, for example model 02364 manufactured by Sperry Corporation, Phoenix, Ariz., may be used for angle sensor 21 and height sensor 22. When used to measure saw blade angle, the output of angle sensor 21 appearing on lead 16 is a voltage signal that is directly proportional to the angle from vertical on the sensor 21 body, which is equal to saw blade 12 angle from the vertical.

To measure the height of saw blade 12, gravity capacitance inclinometer height sensor 22 produces an output voltage on lead 16 that is proportional to the sine of angle of the sensor 22 body. Since the sensor 22 body rotates with the movement of saw blade 12 pivot arm 15, the height sensor 22 output voltage is directly proportional to the height of saw blade 12 in FIG. 1.

An alternative embodiment to the gravity capacitance inclinometer 21 for measuring angle of saw blade 12 may be provided by linear taper rotary potentiometer 21a, for example model No. MK III-A-270-104 manufactured by New England Instrument Co., Natick, Ma. An alternate embodiment to the gravity capacitance height sensor 22 for measuring height of saw blade 12 may be provided by sine taper rotary potentiometer 22a for example one custom manufactured by New England Instrument Co. having a resistance $R = 50K + 50K \sin\theta$ ohms, where R is resistance in ohms and $\theta$ is the angle of rotation measured from the mid point of the travel of the shaft.

Figure 3:
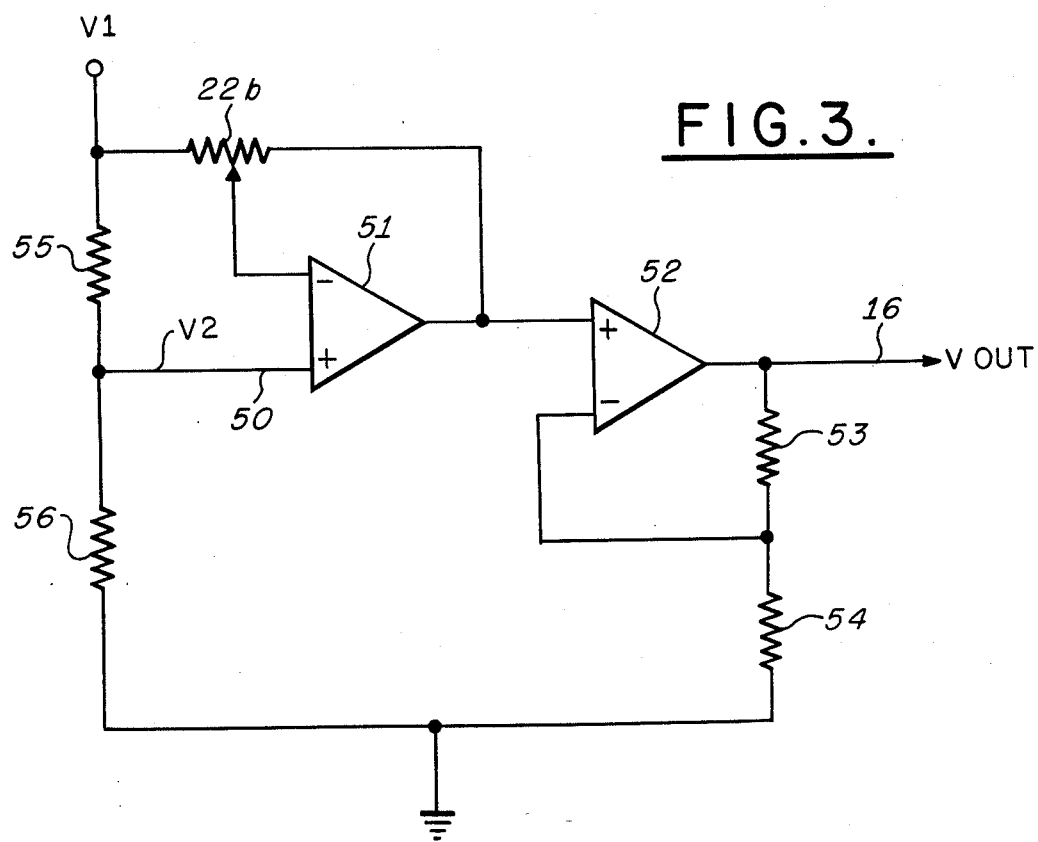
FIG. 3 is a circuit for producing a non-linear voltage output from a linear taper sensor potentiometer.

Referring now to FIG. 3, a non-custom linear motion potentiometer 22b, for example, model 100L manufactured by New England Instrument may be used as an alternative to custom made sine taper potentiometer 22a in FIG. 2. In FIG. 3 a fixed voltage V2 on lead 50 is amplified by a variable gain amplifier 51. The gain of amplifier 51 is a non-linear function of the position of the wiper arm on potentiometer 22b. The transfer function of Vout on lead 16 vs. potentiometer 22b position is:

$$Vout = K[V1 + ET/A \, (V2 - V1)]$$

Where

A is potentiometer 22b wiper arm position in degrees from the V1 end.

ET is the electrical travel of the potentiometer 22b in degrees.

K is the gain of amplifier 52 which equals $R53/R54 + 1$

V2 equals $$V1 \left( \frac{R56}{R55 + R56} \right)$$

V1 is the applied power supply voltage.

A Sine function or other non-linear function can be approximated by varying the starting position of potentiometer 22b wiper arm, V1, V2 and the gain of amplifier 52.

The operation of display unit 30 will now be described. The output of either capacitive inclinometer sensor 21 or 22 or the output of resistive sensor 21a or 22a appears on line 16 and is provided via a filter formed by resistor 31 and capacitor 32 to analog-to-digital (A/D) converter 33, for example model No. ICL7126CPL manufactured by Intersil Inc., Cupertino, Calif. A/D converter 33 digitizes the input 33a received from the angle or height sensors 21/21a or 22/22a and provides an output on line 34 to drive a visual readout display, for example a 3½ digit liquid crystal display model FRS-1200 manufactured by Optrex Corp., Tokyo, Japan.

Analog-to-digital converter 33 has a differential input 33b which is connected to the wiper of zeroing potentiometer 36 for providing a voltage to zero the display 35 over the normal range of input voltages appearing at input 33a. Specifically, when measuring the angle of saw blade 12, potentiometer 36 may be used to zero the display during calibration. When measuring the height of saw blade 12, potentiometer 36 may be used to reset the display when a saw blade of different diameter is used or to set an arbitrary zero point anywhere within the normal height range of saw blade 12. Reference input 33c is attached to the wiper variable potentiometer 37. Potentiometer 37 is adjusted to provide overall system gains during height calibration of the system, for example, a calibration at full scale.

Battery 38, typically 9 volts, is connected to voltage regulator and low battery detector 39 through on-off switch 40 and diode 41 which protects display 30 from inadvertent reverse battery installation. Voltage regulator 39, for example, may be model LP2951CN manufactured by National Semiconductor Corp., Santa Clara, Calif. In the preferred embodiment, the regulated d.c. voltage appearing on lead 42 is approximately 6 volts and is determined by the ratio of resistors 43 and 44. If there is insufficient voltage from battery 38 to provide the desired regulated voltage on lead 40, a low battery signal is produced by voltage regulator 39 which is provided to LCD driver 43, for example, model CD4070BCN manufactured by National Semiconductor Corp. LCD driver 43 activates the low battery legend on display 35.

In accordance with the above description, the present invention provides an accurate, simple apparatus for measuring saw blade height and angle. The present invention may be constructed in modular form so that retrofitting to a wide variety of rotary power saws is practical and inexpensive.

While the invention has been described in its preferred embodiments, it is to be understood that the words which have been used are words of description rather than limitation and that changes may be made within the purview of the appended claims without departing from the true scope and spirit of the invention in its broader aspects.

What is claimed is:

1. Apparatus for displaying the height of a rotary saw blade with respect to a horizontal reference in a rotary power saw system, said system including positioning means for adjusting the height of said saw blade with respect to said horizontal reference, said saw blade being journalled in said positioning means and said positioning means being journalled for rotation so as to adjust said height of said saw blade with respect to said horizontal reference, said apparatus comprising:

sensor means disposed on said positioning means for providing a sensor output signal proportional to the sine of the angle between said positioning means and said horizontal reference, a visual display, and electronic means for converting said sensor output signal into signals driving said visual display, said electronic means including adjusting means for adjusting a gain thereof so that said saw blade height is displayed on said visual display.

2. The apparatus of claim 1 in which said electronic means includes further adjusting means for adjusting zero reference of the system.

3. The apparatus of claim 1 in which said visual display comprises a digital display.

* * * * *